United States Patent [19]

Chang

[11] Patent Number: 5,108,048

[45] Date of Patent: Apr. 28, 1992

[54] STOWAGE BIN AND SUPPORT PANEL SYSTEM FOR CONVERTIBLE AIRCRAFT AND METHOD OF INSTALLATION

[75] Inventor: Charles C. T. Chang, Seattle, Wash.

[73] Assignee: The Boeing Company, Seattle, Wash.

[21] Appl. No.: 407,606

[22] Filed: Sep. 15, 1989

[51] Int. Cl.⁵ .......................... B64D 11/00; B64C 1/22
[52] U.S. Cl. .............................. 244/118.1; 244/118.2; 244/118.5
[58] Field of Search ............... 244/118.1, 118.2, 118.5; 312/245, 293; 248/222.2, 223.3; 105/334, 335

[56] References Cited

U.S. PATENT DOCUMENTS

| | | | |
|---|---|---|---|
| 2,551,305 | 5/1951 | Tompkins | 312/328 |
| 3,443,851 | 5/1969 | Earl | 312/245 |
| 3,700,199 | 10/1972 | Matuska | 248/292 |
| 4,279,397 | 7/1981 | Larsson | 248/221 |
| 4,799,631 | 1/1989 | Humphries et al. | 244/118.5 |

OTHER PUBLICATIONS

Drawing of latching assembly labeled Exhibit "A".

Primary Examiner—Joseph F. Peters, Jr.
Assistant Examiner—Anne E. Bidwell
Attorney, Agent, or Firm—William C. Anderson; B. A. Donahue

[57] ABSTRACT

A quickly releasable stowage bin 108 mountable on one or more support panels 110, 110', or 110", affixed to the interior of an aircraft 100. In the installation of a single stowage bin 108, quickly releasable mounting mechanisms 146, and 158, 160, and 168, respectively affix the upper and lower portion of the stowage bin 108 to the upper and lower portion of a support panel or panels. Each support panel 110, 110', and 110" are initially aligned in the factory whereby a conversion of the aircraft 100 from freighter mode to full or partial passenger mode, results in a rapid, easy, secure, and quality installation of each stowage bin 108. The quickly releasable mounting mechanisms 146, and 158, 160, and 168, also facilitate the rapid and easy removal of each stowage bin 108 from within a compartment of the aircraft 100 during conversion of that compartment from passenger mode to freighter mode.

38 Claims, 13 Drawing Sheets

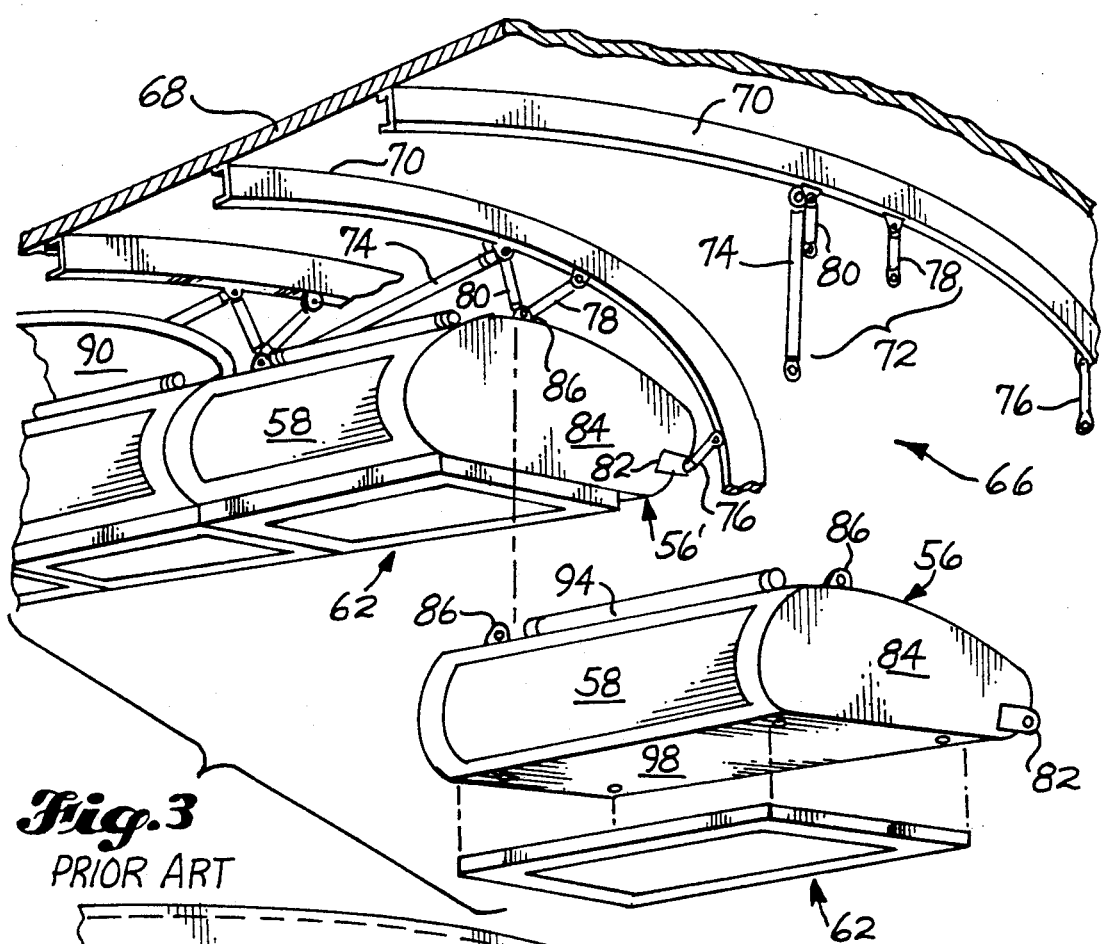
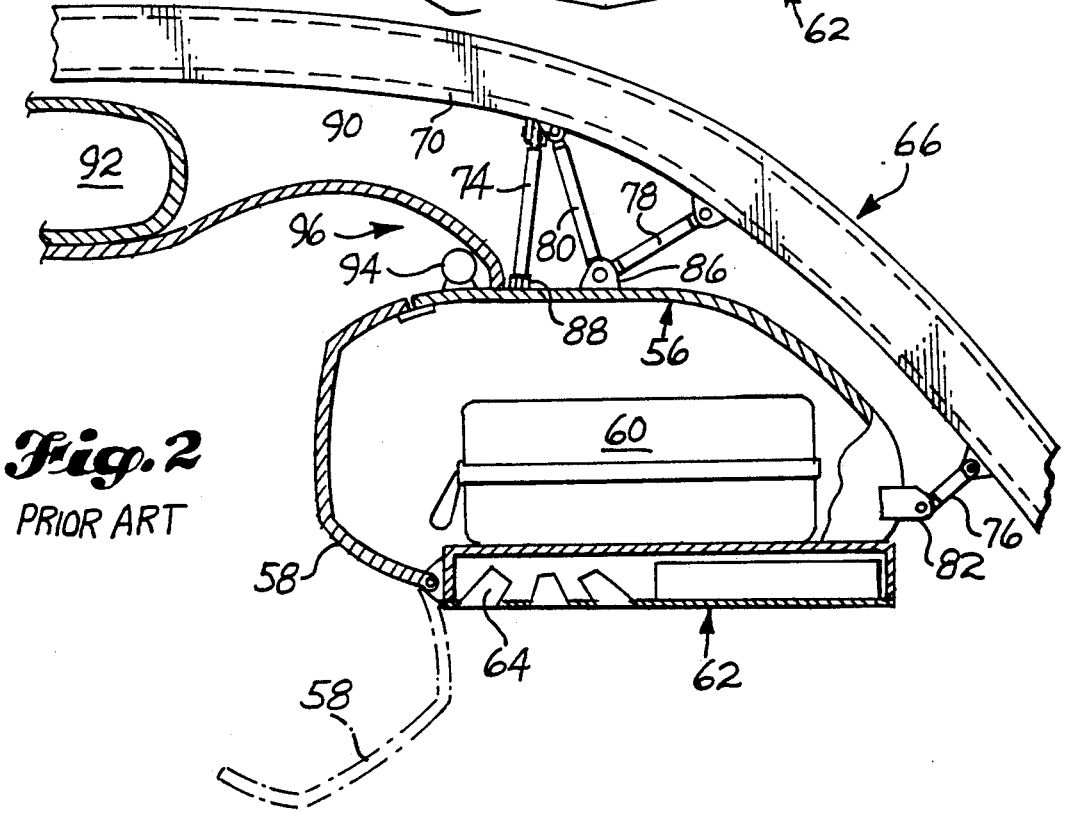
Fig. 3 PRIOR ART
Fig. 2 PRIOR ART

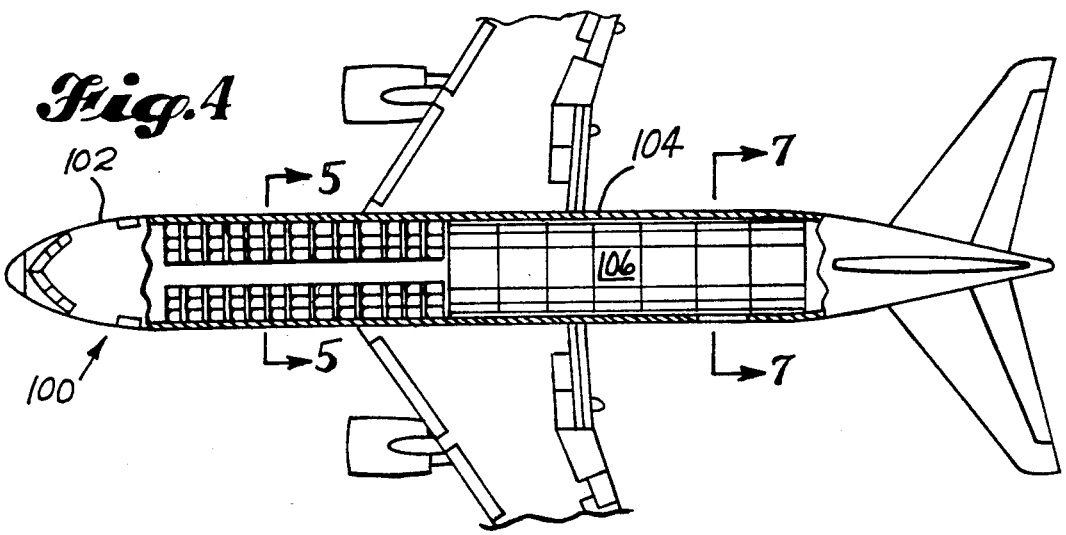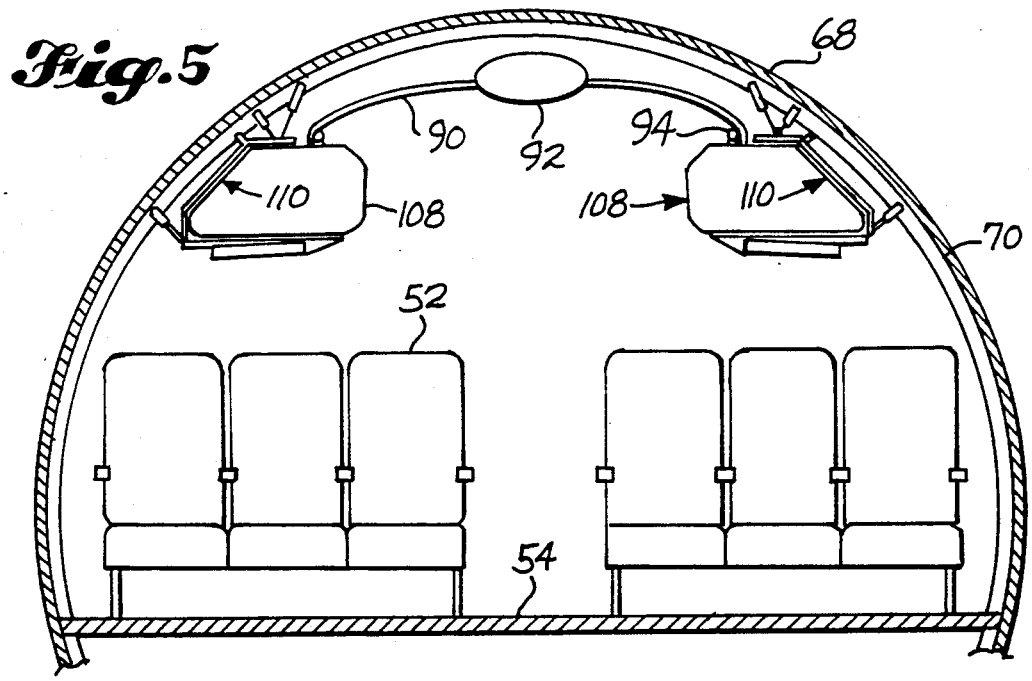

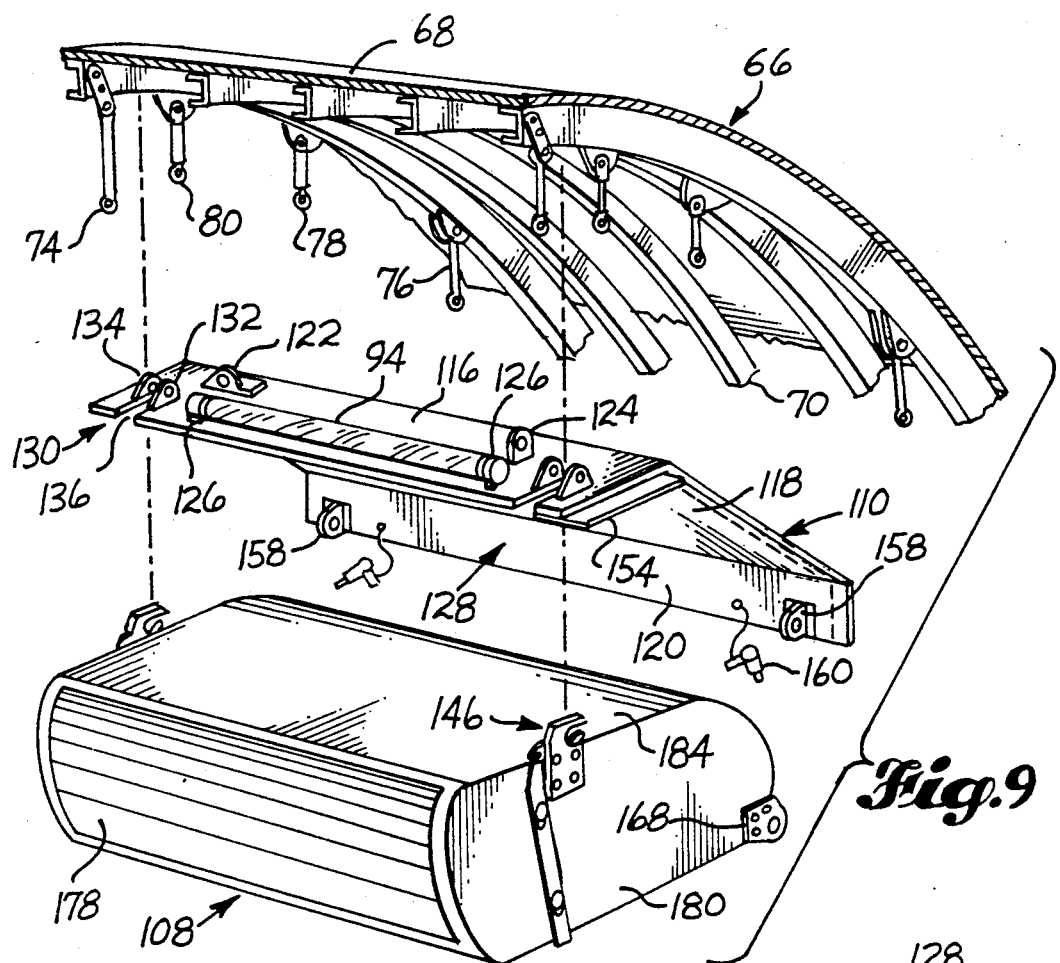
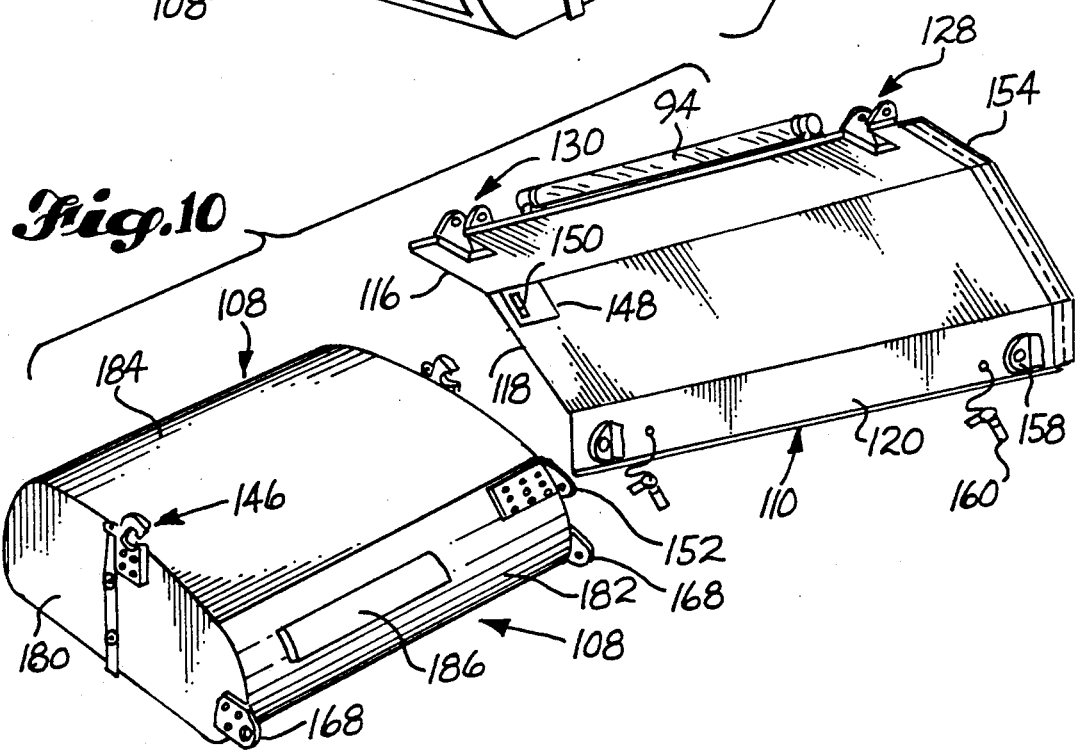

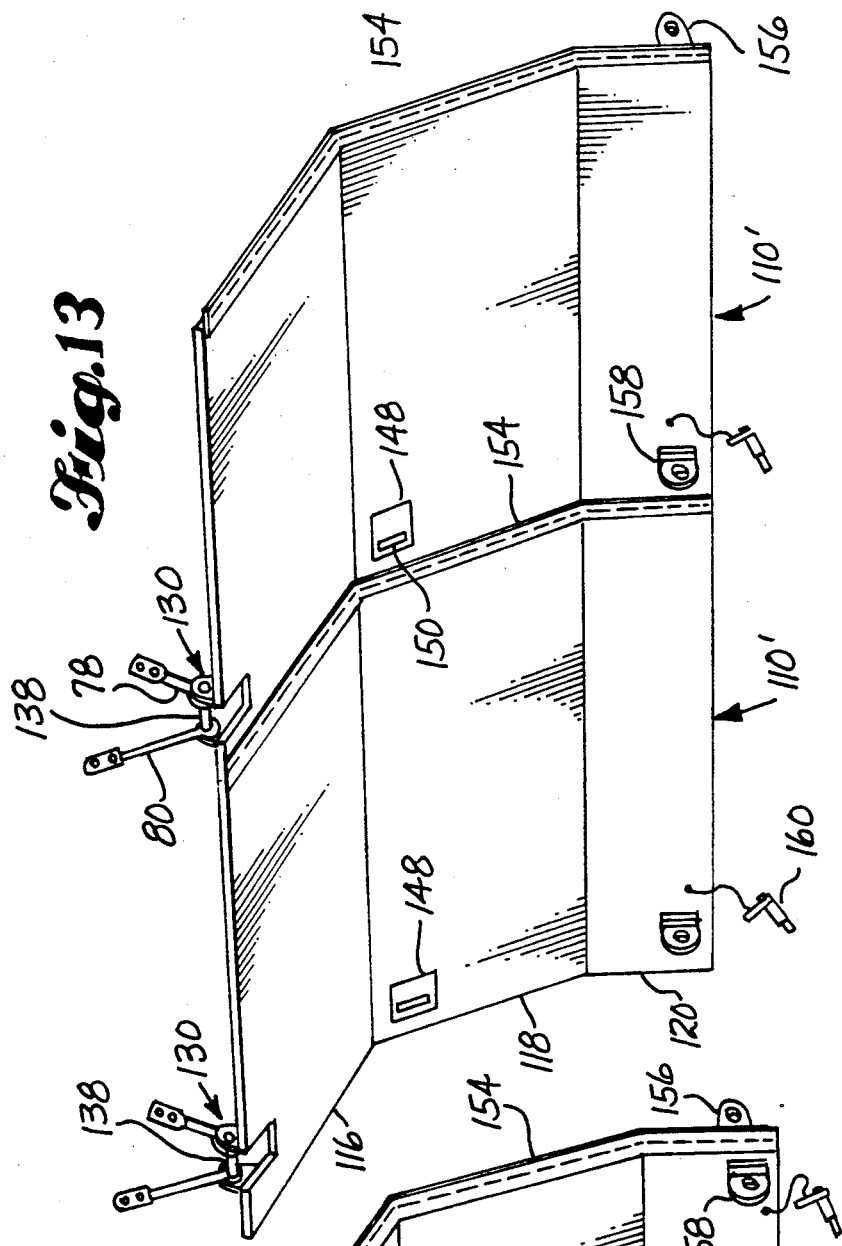

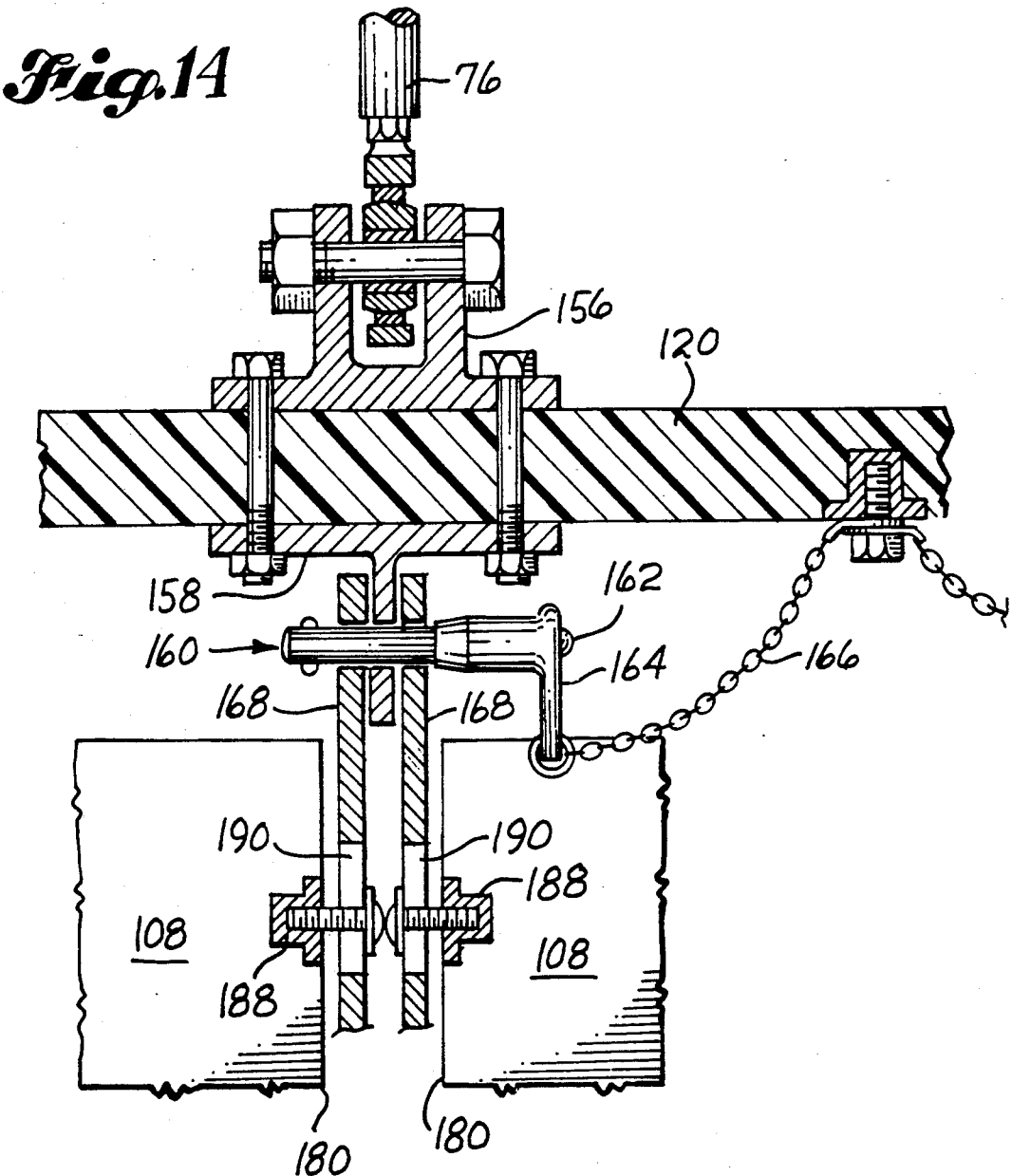

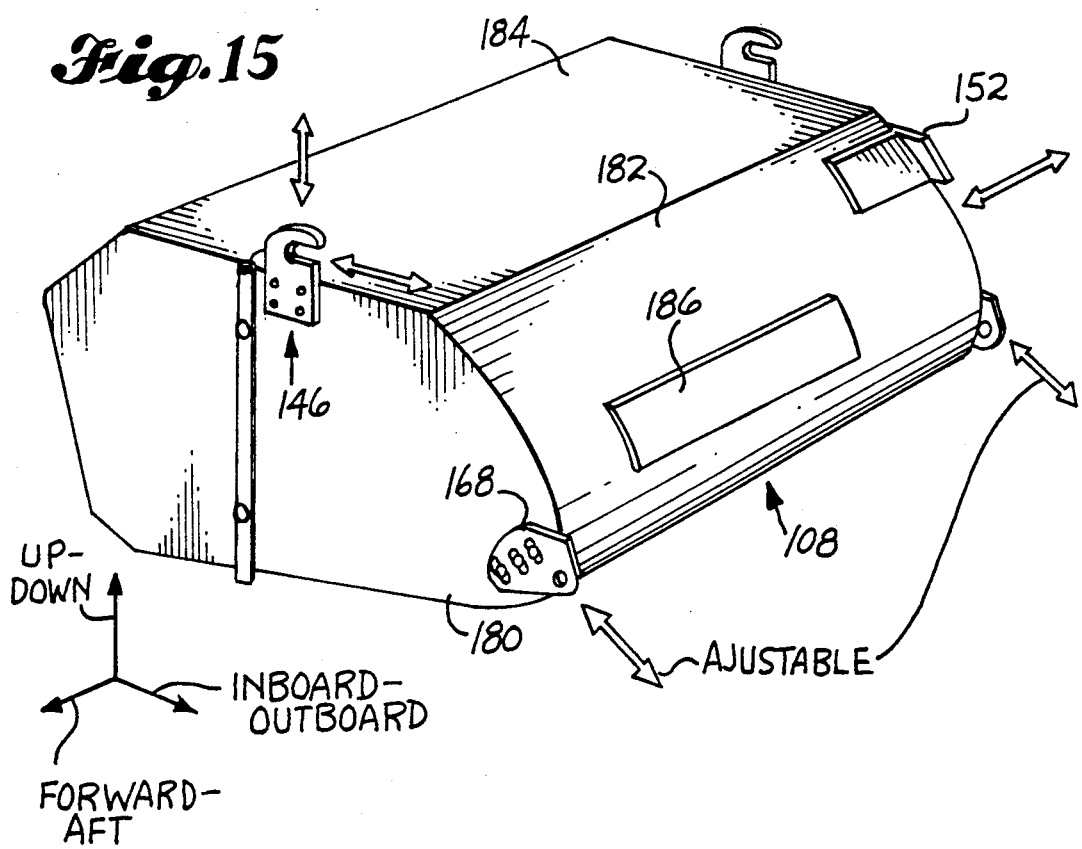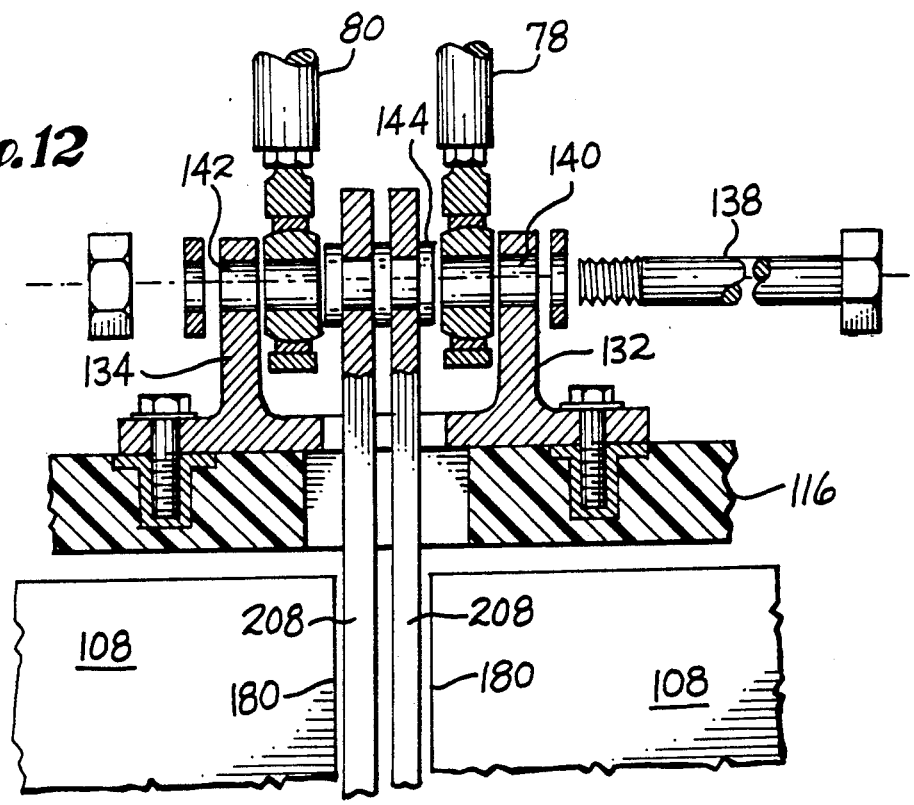

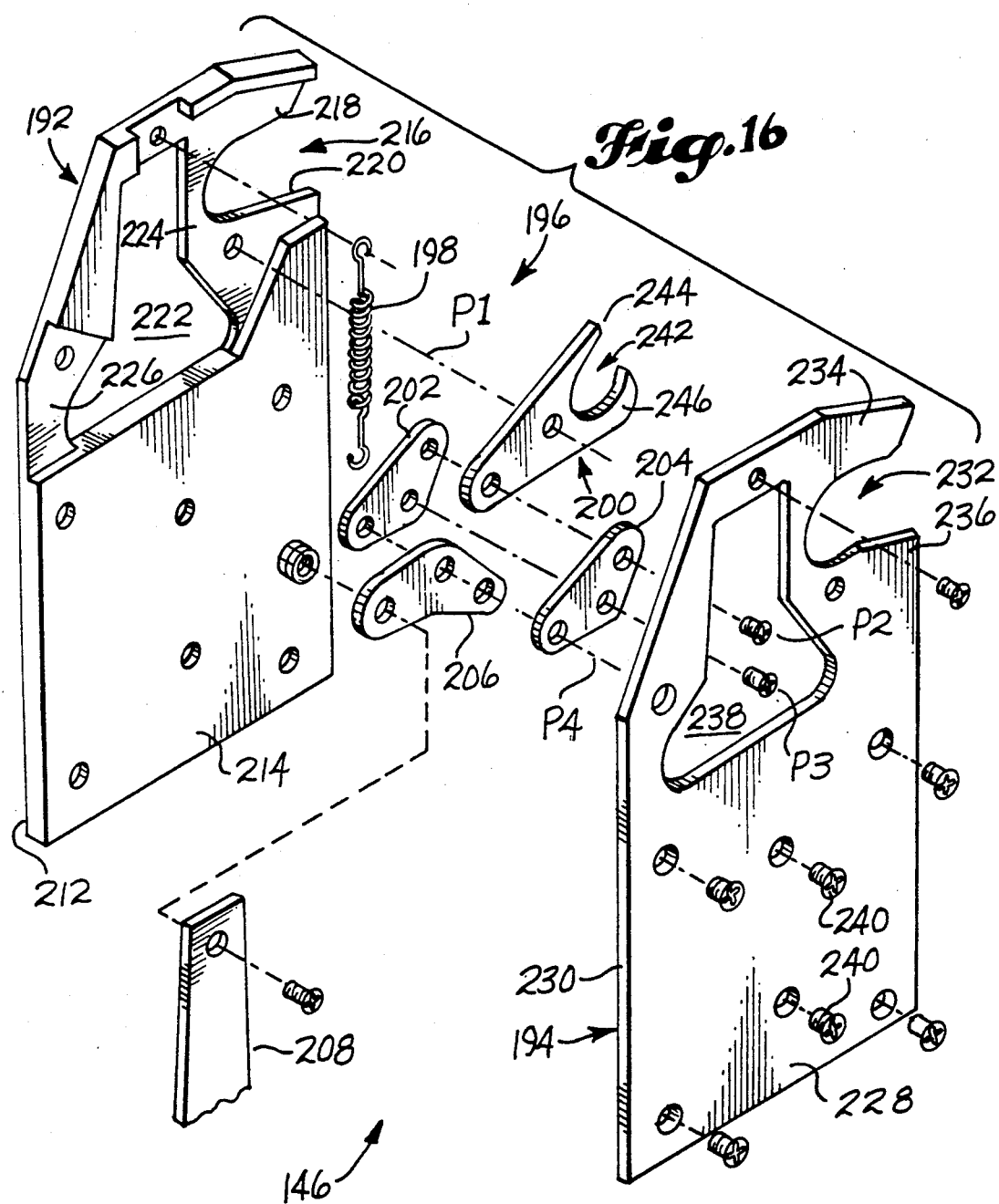

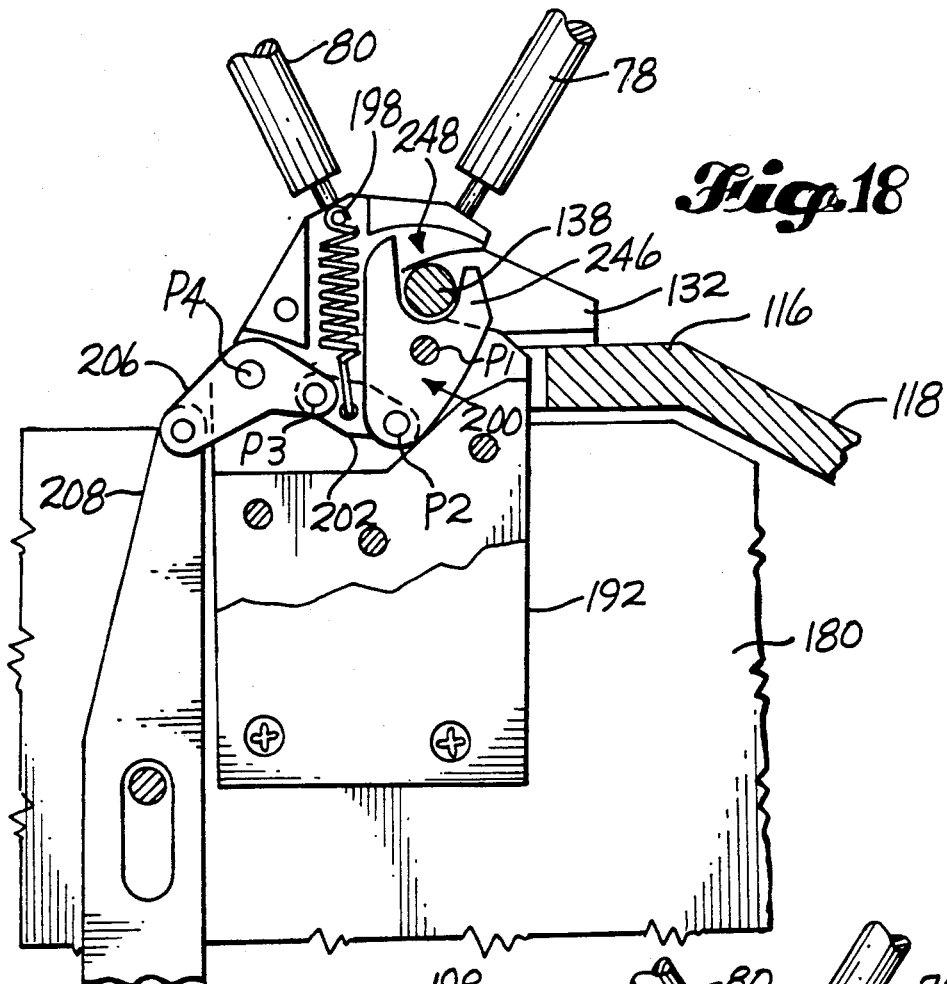

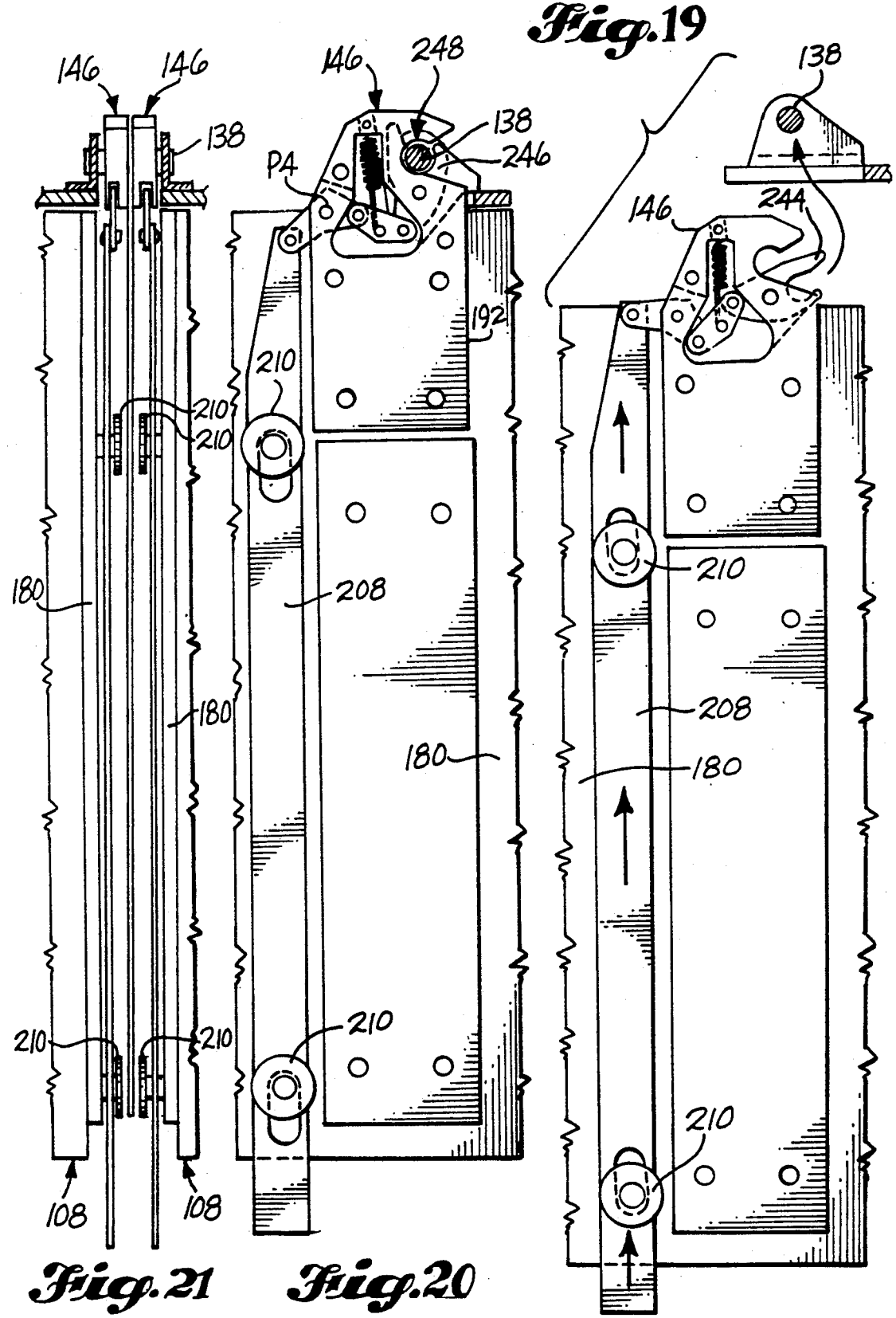

STOWAGE BIN AND SUPPORT PANEL SYSTEM FOR CONVERTIBLE AIRCRAFT AND METHOD OF INSTALLATION

BACKGROUND AND SUMMARY OF THE INVENTION

The present invention relates to stowage bins. More particularly, the invention relates to stowage bins capable of being quickly and easily installed within, and removed from, the interior of an aircraft.

To maximize profitability and use, an aircraft may have to be capable of multi-use, i.e., carry passengers only, freight or cargo only, or of mixed use where both freight and passengers are carried. It is also important to be able to convert the aircraft from one mode, e.g., passenger, to another mode, e.g., freighter, within a minimum of time, easily, and using relatively simple tools.

When converting from freighter mode to either passenger mode or mixed mode, it is also highly desirable that overhead stowage bins for passengers and other interior trim be installable in such a way that passengers do not perceive any misalignments among the installed bins or trim. The fit and finish of the conversion installation should appear to the passenger that it was accomplished with the same high degree of quality obtainable from the original manufacturer.

In the past, stowage bins were affixed to the interior of the aircraft using commonly used fasteners and techniques which did not facilitate the conversions desired. An attempt at making stowage bins more easily removable from aircraft is disclosed in U.S. Pat. No. 3,700,199, issued Oct. 24, 1972, to Matuska. However, the stowage bin of Matuska is impractical because it does not accommodate all loads experienced in flight. Matuska also seems unconcerned with the problems of converting aircraft from one functional mode to another.

It is therefore an object of the present invention to provide a stowage bin which may be easily, quickly, and accurately installed within, and later removed from, the interior of an aircraft.

Another object of the present invention is to provide a stowage bin which may be installed within, and later removed from, the aircraft interior using no tools.

It is also an object of the invention to provide a support panel for the stowage bin of the present invention whereby the stowage bin can be easily, quickly, accurately, and securely installed within, and removed from, the interior of the aircraft.

Still another object of the invention is the provision of a latching mechanism whereby the present stowage bin may be installed quickly, easily, in a reliable manner, and later removed from, the aircraft.

Yet another object of this invention is the provision of a method of accurately installing stowage bins of the present invention.

These and other objects are accomplished in the present invention using a quickly releasable stowage bin mountable on one or more support panels affixed to the interior of the aircraft. In the installation of a single stowage bin, quickly releasable mounting means respectively affix the upper and lower portion of the stowage bin to the upper and lower portion of a support panel. Each support panel is initially aligned in the factory whereby a conversion of the aircraft from freighter mode to full or partial passenger mode, results in a rapid, easy, secure, and quality installation of each stowage bin. The quickly releasable mounting means also facilitates the rapid and easy removal of each stowage bin from within a compartment of the aircraft during conversion of that compartment from passenger mode to freighter mode.

Other objects, advantages, and features of the present invention will be more apparent from the following description and accompanying drawings where the same reference numeral is used to denote the same element.

BRIEF DESCRIPTION OF THE DRAWINGS

FIG. 2 is a side sectional view of the conventional stowage bin of FIG. 1 and a partial sectional view of the aircraft internal frame, interior ceiling panel, and air conditioning duct.

FIG. 3 is a partial perspective view showing the installation of the stowage bin of FIG. 2.

FIG. 4 illustrates a plan view of a multi-mode aircraft carrying passengers in a forward compartment and freight in a converted aft compartment.

FIG. 5 is a sectional view, taken along lines 5—5 in FIG. 4, of the passenger compartment of FIG. 4., and illustrating the sides of the releasable stowage bins and edges of the support panels of the present invention.

FIG. 9 is a general perspective of the internal frame of the aircraft of FIG. 4., a stowage bin, and a first embodiment of the support panel of the present invention.

FIG. 10 illustrates the back panel of the stowage bin of FIG. 9 and the interior facing surfaces of the support panel of FIG. 9.

FIG. 11 is an isolated perspective view of the first embodiment of the support panel.

FIG. 12 is an enlarged partial sectional view showing two adjacent latching assemblies clamped to an upper support affixed to a support panel.

FIG. 13 is a perspective view of a second embodiment of a support panel of the present invention.

FIG. 14 is an enlarged partial sectional view showing a lower support affixed to a support panel.

FIG. 15 illustrates the possible loading on a stowage bin of the present invention and how such loading is supported.

FIG. 16 is an exploded view of a releasable latching assembly of the present invention.

FIG. 17 is a partial side view of the latching assembly of FIG. 11 just prior to installation of a stowage bin onto a support panel.

FIG. 18 is a partial side view of the latching assembly of FIG. 11 just after installation of a stowage bin onto a support panel.

FIG. 19 is a view similar to FIG. 12 but providing a better overall perspective of the latching assembly of FIG. 11 just prior to installation of a stowage bin onto a support panel.

FIG. 20 is a view similar to FIG. 13 but providing a better overall perspective of the latching assembly of FIG. 11 just after installation of a stowage bin onto a support panel.

FIG. 21 is a partial side view showing the latching assemblies of two adjacent installed stowage bins.

DETAILED DESCRIPTION OF THE DRAWINGS

Figure 1:
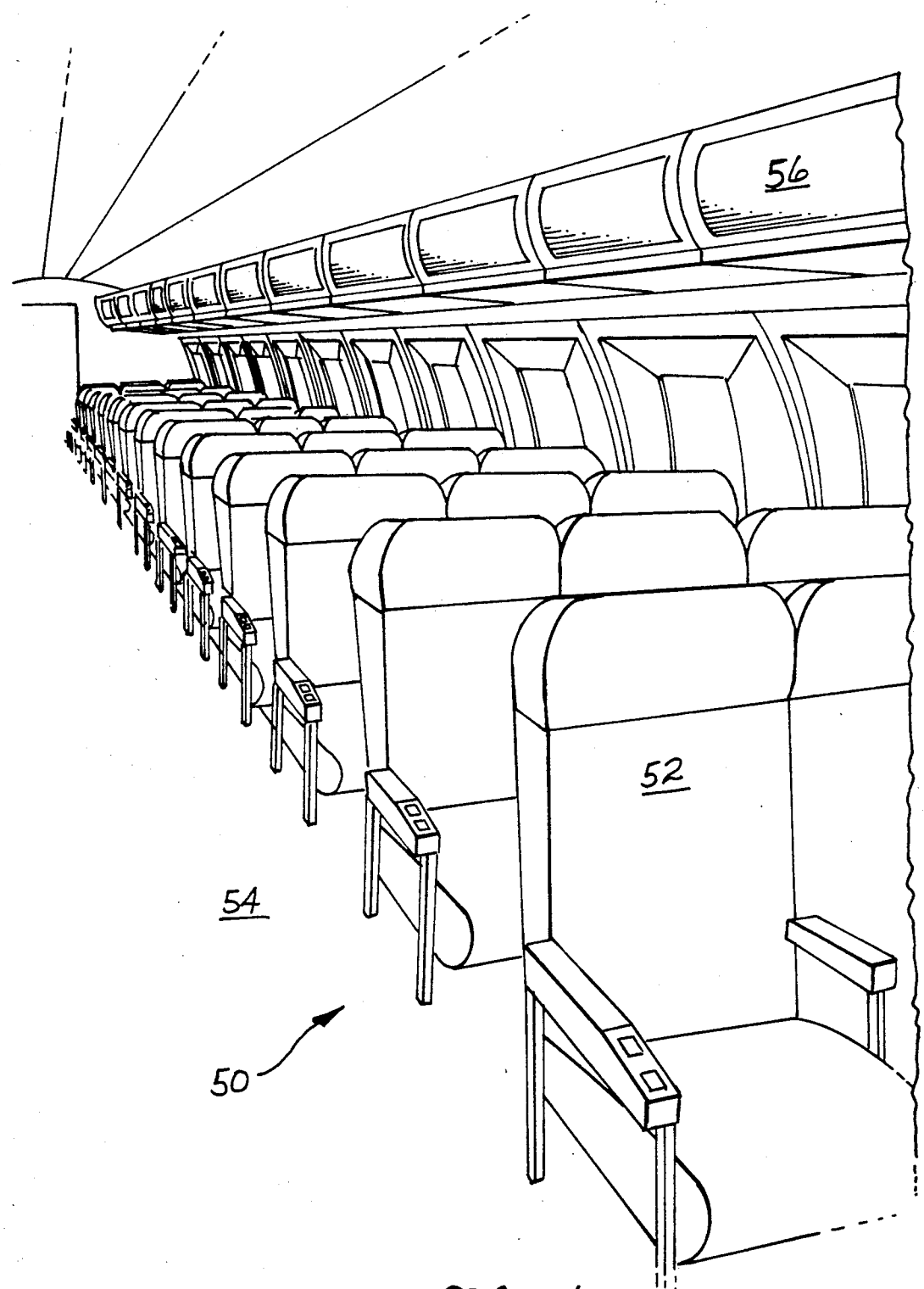
FIG. 1. is a general perspective view illustrating passenger seats and conventional overhead stowage bins Positioned on the port side of the passenger compartment of a conventional aircraft and looking towards the aft section of the aircraft.

The interior 50 of the passenger compartment of FIG. 1 comprises passenger seats 52 mounted on tracks (not shown) on either side of an aisle 54. Mounted above the seats 52 is a row of perfectly aligned overhead stowage bins 56. These bins have a latchable door 58 which may be opened (open position shown in phantom in FIG. 2) to gain access to the interior of the bin for various reasons, e.g., for storing carry-on luggage 60. Mounted below each of the stowage bins is a passenger service unit (PSU) 62 containing, e.g., means for providing emergency oxygen (not shown), reading lights 64, etc.

As shown in FIGS. 2 and 3, the conventional stowage bins 56 are fixedly attached to the framework 66 formed within the outer skin 68 of the aircraft. The framework 66 comprises a plurality of beams 70 spaced apart an appropriate distance, e.g., approximately twenty (20) inches. Not all beams 70 are shown in FIG. 3 for purposes of clarity. Bolted to and depending from selected beams 70 are a plurality of adjustable tie rods including a group of radial tie rods 72 and an upper diagonal tie rod 74 extendable along the thrust axis of the aircraft. The group 72 of radial tie rods includes a lower tie rod 76, an upper outboard tie rod 78, and an upper inboard tie rod 80.

A lower tie rod 76 is fastened to a lower bracket 82 fixed at the lower outboard portion of each side 84 of the stowage bin 56. An upper outboard tie rod 78 and an upper inboard tie rod 80 are connected to an upper bracket 86 mounted to the upper portion of each side 84 of the stowage bin 56. The aft end of a first stowage bin 56 and the forward end of a second stowage bin 56' are carried by the same group 72 of adjustable radial tie rods, as shown in FIG. 3. Aft is considered to the left and forward to the right in FIG. 3 and the following figures. A diagonal tie rod 74 is fastened to a diagonal mounting bracket 88 fixed to the upper surface of the stowage bin 56.

While a group 72 of radial tie rods support the aft end of a first stowage bin 56 and the forward end of the second stowage bin 56', there is a one-to-one correspondence between a diagonal tie rod 74 and each stowage bin. During normal use, the plurality of adjustable tie rods secure each stowage bin against loads experienced along the roll, yaw, and pitch axes of the aircraft.

When the stowage bins 56 are initially installed in the aircraft at the factory, a heavy fixture (not shown) is secured to the passenger seat tracks (not shown) set in the deck of the aircraft. Using a conventional method, each tie rod (74–80) is adjusted whereby each stowage bin 56 is positioned at a precise location relative to the deck fixture. When the installation is complete, each stowage bin 56 is positioned in exact alignment with all other stowage bins along the same row. As can be readily understood, the initial installation of these stowage bins 56 is very time consuming, complicated, and intensive in the use of labor, tools, and equipment.

After installation of the stowage bins 56, an arcuate ceiling panel 90 is connected to the inboard portion of the upper surface of the stowage bin by a clamp (not shown) and to the air conditioning duct 92 running along the length of the aircraft. A ceiling light 94 and its ballast are positioned in the cove 96 formed by the ceiling panel 90 and the upper surface of the stowage bin. Finally, a PSU 62 is mounted by an appropriate means to the undersurface 98 of the stowage bin 56. All the electrical wiring to the ceiling light 94, PSU 62, etc. have not been shown for the purpose of clarity.

When a compartment of an aircraft is converted from passenger mode to freighter mode, the PSU 62 and interior trim are first removed to gain access to the various tie rods (74–80). During the removal of a stowage bin, auxiliary lighting may have to be brought into the aircraft for the workers performing the conversion. As is clear, this conversion process can also be quite time consuming and intensive in the use of labor, tools, and equipment.

When it is desired to convert all or a portion of the aircraft from freighter mode to passenger mode, the above overhead stowage bin installation process is substantially repeated. However, often those performing the conversion do not have the heavy deck fixture used at the factory to install the stowage bins 56 resulting in an extremely time consuming, difficult, and often unsatisfactory stowage bin installation. Frequently, the stowage bins 56 are improperly aligned leading to customer dissatisfaction with the fit and finish of the converted compartment of the aircraft. Even if the conversion is effected with a fixture used by the factory, the original problems with the initial installation are repeated. Due to the limited amount of time available for a conversion, the fixture is often not used at all. The above problems are solved in the present invention, as will be better understood.

Figure 6:
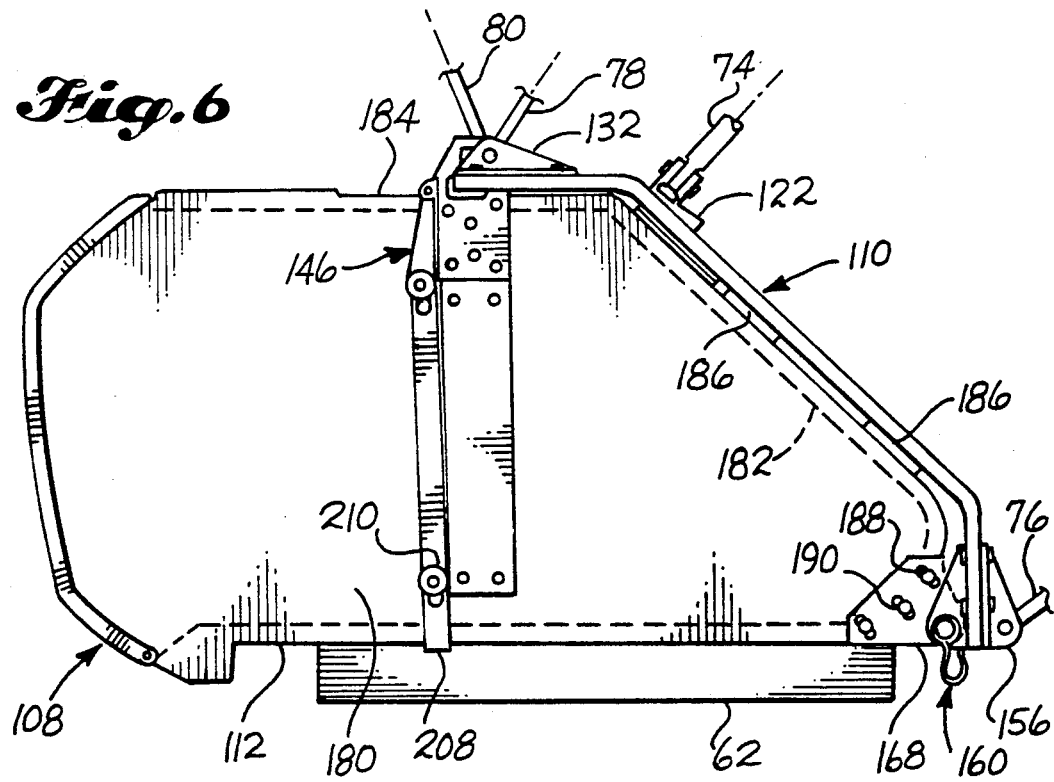
FIG. 6 depicts an enlarged side view of the releasable stowage bin and the support panel of FIG. 5.

Turning now to FIG. 4., an aircraft 100 is shown in a multi-mode configuration. The forward section 102 of the aircraft 100 is for passengers only; the aft section 104 of the aircraft 100 is for cargo or freight 106 only. Positioned within and on both sides of the aircraft 100 is a plurality of quickly removable stowage bins 108 and stowage bin support panels 110 of the present invention (see FIGS. 5 and 6). Also shown in FIG. 5 and in FIG. 6, is a PSU 62. The PSU 62 does not form part of the present invention and will not be described in great detail. However, it should be noted that the PSU 62 is supported from the bottom face 112 of a stowage bin 108 of the present invention using any convenient attachment means.

Figure 7:
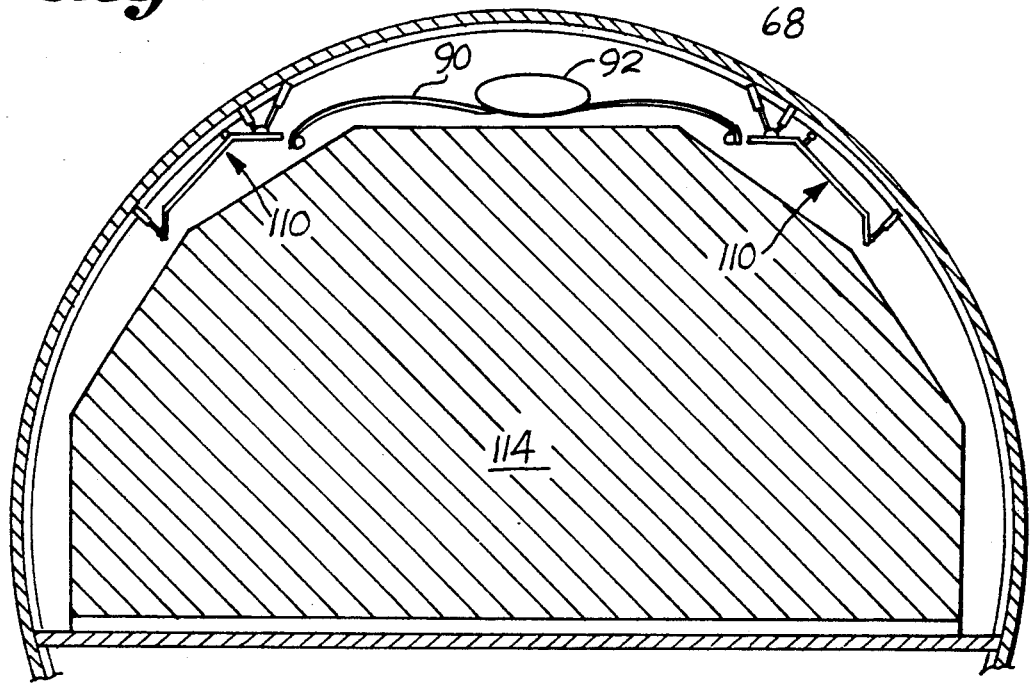
FIG. 7 is a sectional view of the converted aft cargo compartment, taken along lines 7—7 in FIG. 4, and generally illustrating a side view of the support panels of the present invention.
Figure 8:
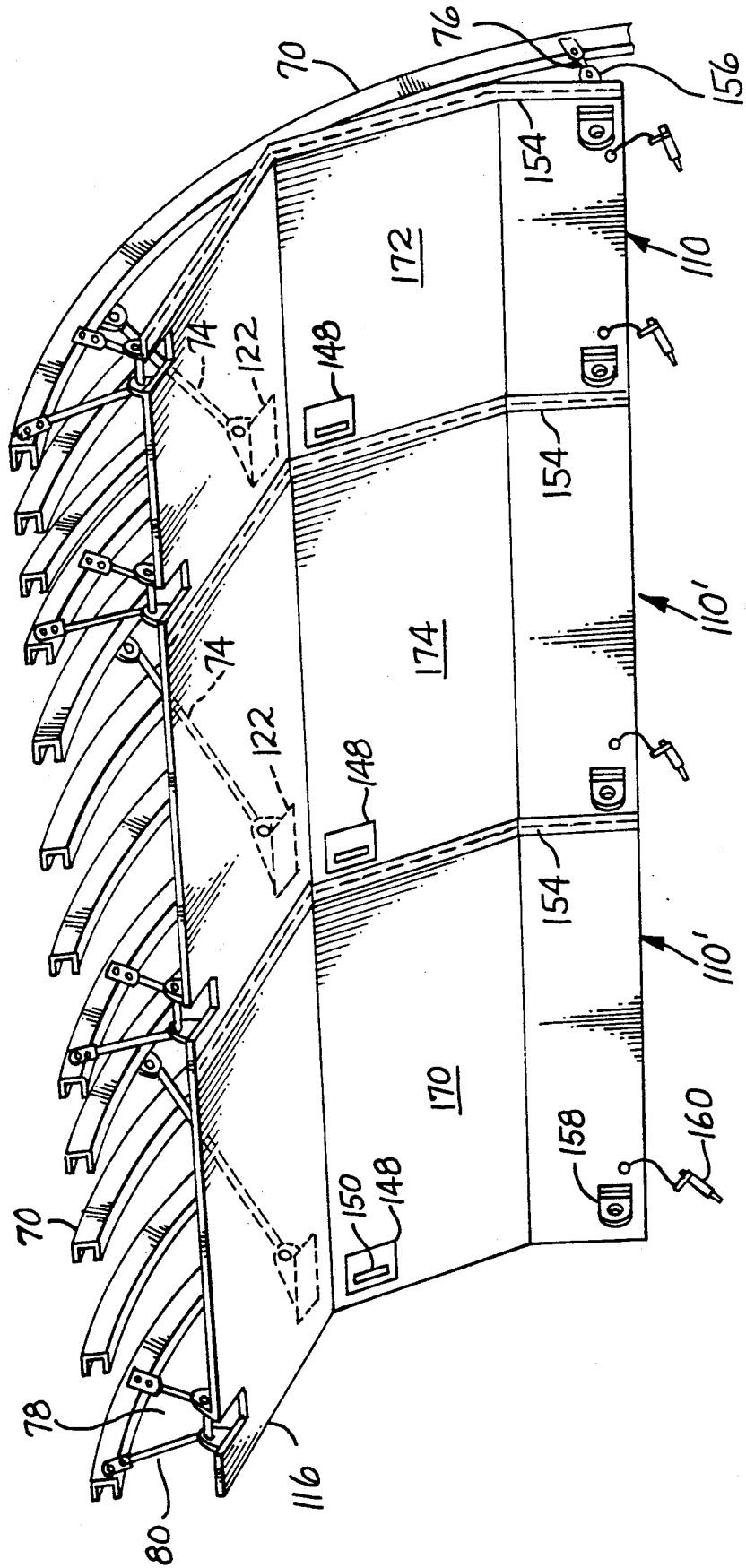
FIG. 8 is a partial perspective view of the internal frame of the aircraft of FIG. 4 showing one configuration of the support panels of FIG. 7.
Figure 8A:
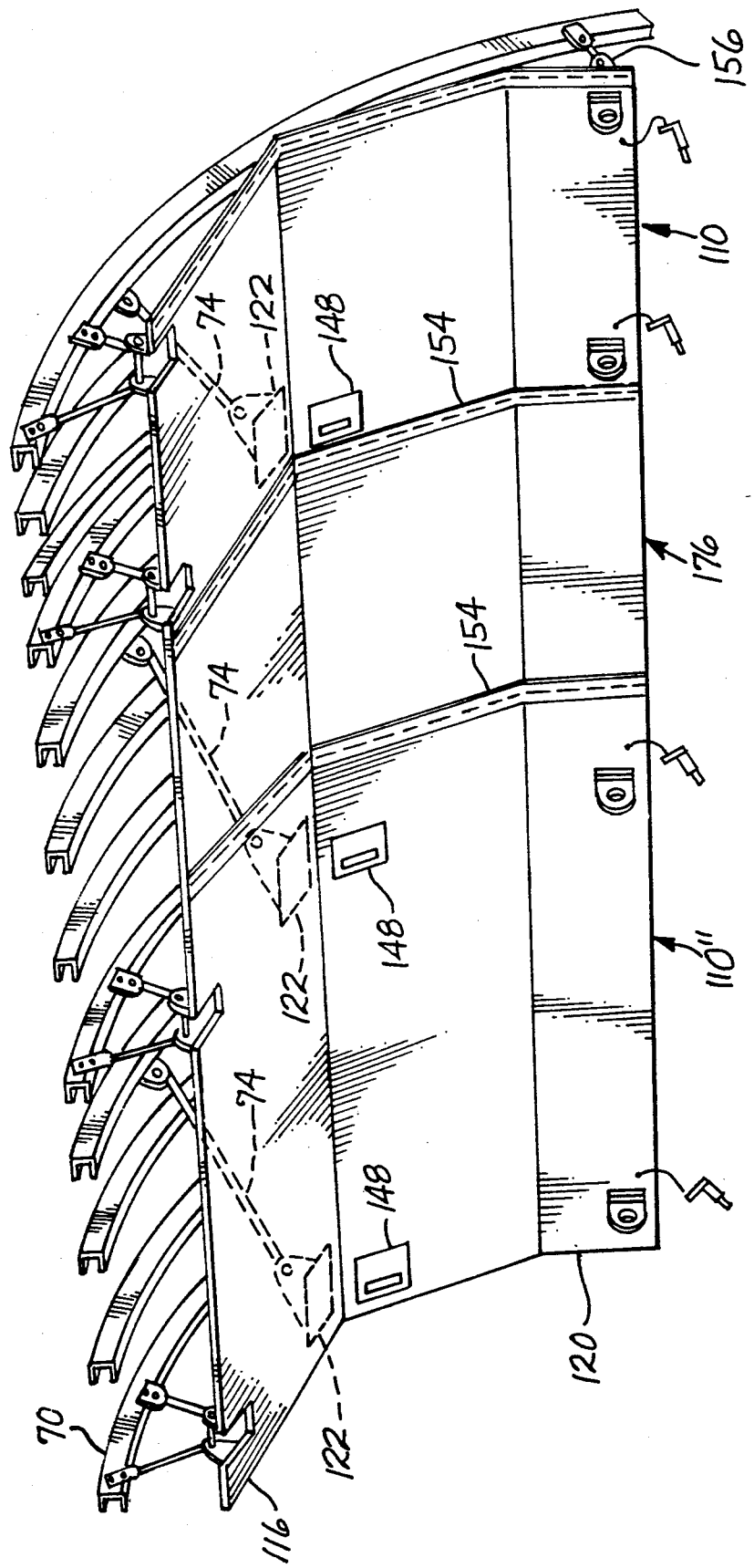
FIG. 8A is a view similar to FIG. 8 showing a second and more preferred configuration of the support panels of FIG. 7.

FIG. 7 shows a sectional of the freighter compartment of the aircraft 100 where passenger seats 52, stowage bins 108, PSUs 62, etc., have been removed during a previous conversion. As seen in FIGS. 8 and 8A, one or more support panels 110, 110' and 110" remain in position above the freight volume envelope 114 and each supports a ceiling light (not shown in FIGS. 7 and 8 for purposes of clarity, but see FIG. 9.). Illumination of the compartment is made possible or enhanced by the ceiling lights 94 carried by the permanently affixed support panels 110. In some instances, these ceiling lights 94 may obviate the necessity of using auxiliary lighting when conversions are being performed.

FIG. 9 shows the internal framework 66 of the multimode aircraft 100 of FIG. 4. As with the aircraft of FIG. 1, the beams 70 are spaced apart approximately twenty (20) inches. The same lower radial tie rods 76, upper outboard radial tie rods 78, and upper inboard radial tie rods 80 used on the framework 66 shown in FIG. 3 are used in the present invention. As with the stowage bin 56 of FIG. 2., one diagonal tie rod 74 is used per installed stowage bin 108 of the present invention.

The removable stowage bins 108 of the present invention are of varying width depending upon their location within the aircraft 100 and the available spaces within the interior of a passenger compartment. Emergency doors, lavatories, and galleys, etc. (not shown), disposed about various locations within the aircraft 100, normally preclude the use of stowage bins 108 of identical width. Nominally, stowage bins 108 may be on the order of eighty (80) inches wide but may also range sixty (60) or even one hundred twenty (120) inches wide. To accommodate these varying widths, three embodiments of the support panel of the present invention are provided. The first embodiment is designated with the numeral 110, the second with the numeral 110' and the third with the numeral 110''.

FIGS. 9, 10, and 11 illustrate the first embodiment of the support panel 110, of the present invention. It comprises an upper sector 116, an intermediate sector 118, and a lower sector 120. The support panel 110 is configured as a multi-sectional member to enable it to be mounted as closely as possible to the framework 66 of the aircraft 100. It may be made either as a single molded unit or one formed from a single honeycomb panel or its individual components may be attached together with appropriate fastening means.

The top face of the upper sector 116 is provided with a diagonal tie rod mounting bracket 122, a conventional ceiling panel latch 124 (not shown in detail in FIG. 9), a ceiling light 94, ceiling light brackets 126, and forward and aft upper mounting supports 128, 130 respectively. While FIG. 9 shows the mounting bracket 122 mounted upon the top face of the sector 116, it may also be mounted upon the intermediate sector 118 (see FIG. 6). The upper mounting supports 128, 130 each comprise a first and a second radial tie rod bracket 132, 134 respectively, separated by a slot 136 opening outwardly in the inboard (towards the aircraft interior) direction. The first and second radial tie rod brackets 132, 134 support a mounting bolt 138. As shown in FIG. 12., the mounting bolt 138 is inserted in coaxial bores 140, 142 formed in the first and second radial tie rod brackets 132, 134, respectively. The mounting bolt 138 supports an outboard radial tie rod 78 and an inboard radial tie rod 80 separated from the outboard tie rod 78 by a spacer 144. As will be better understood, the mounting bolt 138 comprises an upper support for one or more quickly releasable latching assemblies 146 disposed on the upper portion of adjacent stowage bins 108 of the present invention.

As seen best in FIGS. 10 and 11, a reinforced receptacle 148 is formed in the intermediate sector 118, preferably near its aft end. The receptacle 148 is provided with a slot 150 adapted to cooperate or mate, during installation, with a motion-limiting member or tongue 152 mounted on the stowage bin 108. Also attached on the inboard face of either the aft or forward end of the support panel 110 (shown on forward end in FIGS. 9, 10, and 11) is aluminum sheeting 154 which aids in the alignment of each support panel during initial installation of the support panels 110 in the factory. It also conceals gaps between installed support panels. Other trim, not shown, is substituted for the sheeting 154 proximate galleys, lavatories, etc.

Mounted on both the forward and aft ends of the outboard surface of the lower sector 120 is a lower outboard mounting bracket 156 attachable to a lower radial tie rod 76 (see FIGS. 8, 11, and especially 14 greater detail). On both ends of the inboard face of the lower sector 120 is a forward and an aft lower inboard mounting bracket 158 providing lower support for the lower portion of one or more stowage bins 108. A conventional quick removal pin 160, with a quick release button 162 and a lever 164 for facilitating removal (see FIG. 14.), is located proximate each lower inboard mounting bracket 158 and attached to the support panel 110 by means of a lanyard 166 (see, e.g., FIGS. 11 and 14). The removal pin 160 is adapted to be used to quickly connect and disconnect the lower sector 120 of the support panel 110 to a lower mounting bracket 168 adjustably mounted to a stowage bin 108.

The stowage bins 108 of the present invention must always be properly supported at the top and bottom of both of its sides or ends. Since the stowage bins 108 are usually of varying width, as explained earlier, the present invention provides a second embodiment of a stowage bin support panel, designated 110' in FIG. 13, which can help the first embodiment accommodate the various widths. The second embodiment is fastenable to the first embodiment and may be used to assist in supporting a stowage bin. The second embodiment of the support panel 110 is shown aft and in abutting contact with the first embodiment in FIG. 8 and is the only embodiment illustrated in FIG. 13.

As may be readily ascertained from FIGS. 8 and 13, the second embodiment of the support panel is substantially the same as the first embodiment (FIG. 11). However, in the second embodiment there are no forward supports, i.e., the forward end outboard mounting bracket 156, the forward lower inboard mounting bracket 158, and the forward upper mounting support 128 are not used. Support for the forward end of the second embodiment is provided by the aft end of a forwardly positioned abutting support panel of either the first or the second embodiment. More particularly, the aluminum sheeting attached to the forward end of the second embodiment is fastened to the aft end of another adjacent support panel of either embodiment (see FIGS. 8 or 13).

If a single stowage bin is to be supported, the first embodiment is used exclusively (see FIGS. 9 and 11) since it is capable of fully supporting both the upper and lower end portions of a stowage bin 108. The first embodiment must also be used at the most forward end (last one) of a row of installed stowage bins (see FIG. 8The second embodiment may be used either as the support panel positioned most aft (first one) in a row of support panels or anywhere in between the first support panel and the last support panel.

Using FIG. 8 as an example, imagine a galley just aft of the first support panel 170 configured as the second embodiment and positioned most aft in a row of support panels. Imagine also a lavatory just forward of the last support panel 172 configured as the first embodiment and positioned most forward in the row. Between the first and the last support panel is an intermediate support panel 174 configured as the second embodiment.

When a first stowage bin 108 (none are shown in FIG. 8 for purposes of clarity) is installed on the first support panel 172, the upper and lower portions of the aft end of the first stowage bin 108 are supported by the upper and lower supports of the first support panel 172. The forward upper and lower portions of the first stowage bin 108 are supported by the upper and lower supports of the intermediate support panel 174. The aft upper and lower portions of a second stowage bin 108 are also supported by the upper and lower supports of the intermediate support panel 174. The forward upper and lower portions of the second stowage bin 108 are supported by the aft upper and lower supports of the last support panel 172. A third and final stowage bin 108 is fully supported by the last support panel 172. Appropriate trim replaces sheeting on the forward-most panel proximate the lavatory. As can be seen from this one example, depending upon its location, a stowage bin 108 may be supported by one or more support panels 110, 110'. As will be self evident to the skilled artisan, the width of the support panels 110, 110' can also be varied dependent on the available space (e.g., between the gallery and lavatory), the spacing between the beams, and the desired width of a stowage bin.

A preferred, and stronger configuration of support panels is shown in FIG. 8A. This configuration, which includes the use of support panels 110, also utilizes a third embodiment (designated with the numeral 110") of a support panel of the present invention. The only differences between the support panel 110' and the support panel 110 are the addition of a receptacle 148 near the forward portion of the intermediate sector 118 of the panel 110' and the use of an additional diagonal tie rod bracket 122 on the upper sector 116 of the panel 110". The panels 110 and 110' may be interconnected to a non-load-bearing (cosmetic) panel 176 which is provided with aluminum sheeting 154 along its forward edge. The cosmetic panel 176 is supported between the panels 110' and 110 by first fastening the aluminum sheeting 154 on the panel 110' to the aft edge of the panel 176 and then fastening the aluminum sheeting 154 on the panel 176 to the panel 110.

In use, a first and a second stowage bin 108 (not shown in FIG. 8A) may be supported upon the support panel 110". Thrust loads for each stowage bin 108 are carried by the receptacles 148 on the panel 110" and by two upper diagonal tie rods 74 attached to the brackets 122. The aft upper and lower portions of the first of the stowage bins 108 are carried upon the aft upper and lower supports of the panel 110". The forward portions of the first stowage bin 108 are carried by the forward supports of the support panel 110". The aft portions of the second stowage bin 108 are carried by the forward supports of the panel 110". The forward portions of the second bin 108 are carried by the aft supports of the support panel 110. Finally, the aft and forward portions of a third stowage bin 108 are carried by the aft and forward supports, respectively, of the support panel 110. The most forward sheeting 154 can be replaced with appropriate trim.

As will be obvious to the skilled artisan, many variations may be made using the three embodiments of the support panel of the present invention. The configuration chosen will be one of obvious choice depending upon the factors mentioned above.

Turning again to FIGS. 6, 9 and 10, the stowage bin 108 of the present invention comprises a latchable door 178, at least two side panels 180 separated by any desirable dimension, e.g., normally about eighty (80) inches, a back panel 182, the bottom PSU mounting face 112, an upper surface 184, at least two lower adjustable mounting brackets 168, at least one compression pad 186, the motion-limiting tongue 152, and a pair of quickly releasable latching assemblies 146 used to install the bin 108 to or remove it from a support panel 110, 110' or 110". The width of a latchable door 178 is somewhat greater than the dimension separating the two side panels 180 to accommodate the lower mounting brackets 168 and the quickly releasable latching assemblies 146. Once installed, a passenger will be unaware of their presence and will perceive the best aesthetics possible.

The lower mounting bracket 168 is adjustably secured to each side panel 180 as by adjusting fasteners 188 and extends rearwardly from the back panel 182. the fasteners 188 pass through adjusting slots 190 formed in the bracket 168 (see FIGS. 6 and 14). Through a lower mounting bracket 158 of a support panel 110, 110', or 110", inboard, outboard, up, and down loads may be resisted (see FIG. 15). A PSU 62 may be mounted to the bottom face 112 using any convenient attachment means (not shown) and assists in concealing the latching assemblies 146 of an installed stowage bin 108.

The compression pad 186 may be made of any appropriate material, such as an elastomeric material. It may be attached to the back panel 182 using any suitable fastener or by bonding. The compression pad 186 functions to dampen any relative motion between a stowage bin 108 and a support panel 110, 110', or 110" upon which the bin maybe mounted, i.e., it helps prevents rattling. Either one compression pad 186 can be used, as shown in FIG. 10, or a plurality, as shown in FIG. 6.

The motion-limiting tongue 152, shown in FIG. 10, may be mounted on the back panel 182 of the stowage bin 108 and extends outwardly away therefrom. When a stowage bin 108 is installed upon a support panel 110, 110', or 110", the tongue 152 is inserted into the slot 150 formed in the receptacle 148 attached to the intermediate sector 118 of the support panel. In use, the motion-limiting tongue 152 resists thrust (forward-aft) loads experienced by the stowage bin through 1 diagonal tie rod 74 (see FIG. 15).

Referring now to FIGS. 6, 9, and 16, the quickly releasable latching assembly 146 is shown as comprising a housing 192, a cover plate 194, a linkage subassembly 196, and an overcenter motion assist spring 198. The linkage subassembly 196 comprises an elongated pivotable jaw 200, a left and a right intermediate link, 202, 204 respectively, a wedge-shaped handle link 206, and a translatable handle 208. Either the housing 192 or the cover plate 194 may be fastened to a side panel 180 of the stowage bin 108 (see also FIG. 21.) and the handle 208 is constrained to move up or down along the side panel 180 using any appropriate means, e.g., using restraint buttons 210 fastened to a side panel (see also FIGS. 17-20).

A PSU 62 mounted on the lower face of an installed stowage bin 108 normally conceals the lower portion of the handle 208. However, as may be best seen from FIG. 6. (also see FIGS. 19-21), when it is desired to remove a stowage bin 108 from a support panel 110, 110', or 110", the PSU 62 is removed revealing the lower portion of the handle 208 enabling the stowage bin to be quickly and easily removed without the use of any tools, as will be understood.

The housing 192 comprises a first latching assembly mountable face 212, a cover plate mating surface 214, an outwardly extending fixed jaw 216 defined by a fixed upper lip 218 and a fixed lower lip 220, an opening 222 to accommodate the intermediate links 202, 204, a first recess 224 for accepting the pivotable jaw, and a second recess 226 for the handle link and the translatable handle. The cover plate 194 has an overall shape complementary to that of the housing 192 and comprises a second latching assembly mountable face 228, a housing mating surface 230, an outwardly extending fixed jaw 232 defined by a fixed upper lip 234 and a fixed lower lip 236, an opening 238 to accommodate the intermediate links, and means for fastening the cover plate to the housing, e.g., screws 240.

The latching assemblies 146 fastened to each of the sides 180 of the stowage bin 108 are identical. However, to avoid one translatable handle 208 on one stowage bin interfering with another handle on an adjacent stowage bin 108, it has been found convenient to mount either the housing 192 or the cover plate 194 to the side of the stowage bin. As is perhaps seen best from FIG. 21., the first mountable face 212 of the housing 192 is affixed to the right side of a stowage bin 108 on the left (facing the bin) whereas the second mountable face 228 of the cover plate 194 is attached to the left side of the stowage bin 108 on the right.

As illustrated in FIGS. 16., 17., and 18., the Pivotable jaw 200 comprises an elongated member having, at its one end, an outwardly opening latching recess 242 defined by an upper latching triggering arm 244 and a lower latch member 246. The pivotable jaw 200 is supported by the housing 192 within the first recess 224 by a pin P1. The pivotable jaw 200 is capable of pivoting from an open (unlatched) position, shown in FIGS. 17 and 19, to a closed (latched) position, shown in FIGS. 18 and 20. In the open position, a mounting bolt 138 of an upper support of a support panel 110, 110', or 110" can easily contact the triggering arm 244. In the closed position, the mounting bolt 138 is securely latched within a retention recess formed between the fixed jaws 216, 232 of the housing 192 and cover plate 194 and the lower latch member 246.

As seen in FIG. 16., the other end of the pivotable jaw 200 is pinned as at P2 to a first end of the left and the right intermediate links 202, 204 which are disposable within the openings 222, 238. The intermediate links 202, 204 are pinned at P3 to the handle link 206 which is pivotably attached to the housing 192 by a pin P4 positioned in the second recess 226.

The translatable link 208 may be pinned on either side of the handle link 206. Its pinned position is dependent on the side panel 180 selected for mounting the latching assembly 146 (see FIG. 21.). If the first mountable surface 212 of the housing 192 is selected, the handle 208 is pinned on the side of the handle link 206 closest to the side panel 180, i.e., the left side as viewed in FIG. 21. Conversely, if the cover plate 194 is used to mount the latching assembly 146, the handle 208 is pinned on the right side of the handle link 206. This positioning eliminates any interference one handle 208 may have with an adjacent handle 208, allows the attachment of the handle 208 to a side panel 180 by the restraint buttons, and minimizes the volume occupied by the latching assemblies 146 between adjacently mounted stowage bins 108.

Referring now to FIGS. 17-20., the latching assembly 146 has two locked positions; one where the translatable handle 208 cannot move, a second where the pivotable jaw 200 cannot rotate. In the first position, shown in FIGS. 17 and 19, the handle 208 cannot translate due to the alignment of the pins P1, P2, and P3 along substantially the same line, i.e., the handle link 206 is in a "dead-center" position. The pivotable jaw 200, however, is able to pivot. In this position, the triggering arm is always capable of contacting a mounting bolt 138 of an upper support. This eliminates any need to reset a pivotable jaw 200 to an open position prior to installation of a stowage bin 108 onto a support panel 110, 110', or 110".

In the second position shown in FIGS. 18 and 20., the pivotable jaw 200 has been previously moved to its closed position. The pivotable jaw is unable to pivot to its unlatched position because of the substantial alignment of pins P2, P3, and P4. In this case, the pivotable jaw 200 is in a dead-center position. The translatable handle 208 can translate upwardly.

Movement of the pivotable jaw 200 from its unlatched position (FIG. 17) to its latched position (FIG. 18) is effected during the installation of a stowage bin 108 onto a support panel. During the installation, the fixed jaws 216, 232 of the housing 192 and cover plate 194 and the outwardly extending open latching recess 242 are presented to a mounting bolt 138 as shown in FIGS. 17 and 19. As the stowage bin 108 is pressed against the support panel (110, 110' or 110"), the triggering arm 244, and thus the pivotable jaw 200, is rotated to a counterclockwise (as viewed in FIG. 17) position where the mounting bolt 138 is constrained within the retention recess 248 formed between the latching arm 246 and the fixed jaws 216, 232 of the housing 192 and cover plate 194 (see FIG. 18).

By arranging the linkage geometry properly, the latch assembly 146 is provided with the two dead-center positions described above. However, by the application of a small force using an overcenter spring 198 attached to the intermediate links 202, 204 (see FIGS. 16–18), the intermediate links are able to move beyond either of the dead-center positions to an overcenter position where either the translatable handle 208 or the pivotable jaw 200 is positively locked.

The initial installation of the stowage bins 108 and support panels 110, 110', or 110" of the present invention is performed in the factory. The same heavy fixture useful in installing the stowage bins 56 of FIG. 2 is used, but only this first time. In the initial installation e.g., of a support panel 110, the panel is first attached to the aircraft framework 66. In other words, inboard and outboard radial tie rods 78, 80 are attached to a mounting bolt 138 (see FIG. 12.), a diagonal tie rod 74 is fastened to the diagonal tie rod mounting bracket 122 (see FIG. 6.), and lower radial tie rods 76 are bolted to lower outboard mounting brackets 156 (see FIG. 8).

The latching assembly 146 of a stowage 108 bin is presented to selected support panels 110 and pressed against the support panel (see FIG. 19) until the mounting bolt 138 is securely clamped within the retention recess 248 (see FIG. 20.). The lower mounting brackets 168 of each stowage bin 108 are pinned to available lower inboard mounting bracket(s) 158 using quick removal pins 160 (see FIG. 14.).

With the aid of the alignment fixture disposed in the seat tracks, the various tie rods are adjusted to ensure perfect alignment of all the support panels 110. Minor adjustments can also be made with the aid of the adjustable brackets 168 disposed on the lower portion of each stowage bin 108. This initial installation and adjustment takes about as much time as it takes to install the stowage bins 56 of FIG. 2, but remember, it is not necessary to perform this process in any future conversions.

Assume it is desired to convert an aircraft from passenger mode entirely to freighter mode. At first, all the PSUs 62 are removed revealing the lower or bottom tip of each of the translatable handles 208 (see FIG. 6). Each removal pin 160 is pulled from each of the lower mounting brackets 158. The bottom tip of each translatable handle 208 is then pushed up, releasing the pivotable jaw 200 from its latched position, allowing each mounting bolt 138 to be unclamped. A stowage bin 108 is now released and, as can be seen, very quickly and easily, using no tools. Further, because the support panels 110 remain (see FIG. 8), auxiliary illumination is superfluous because the ceiling lights 94 remain with the support panels 110. The ceiling lights 94 are not shown in FIGS. 8, 8A, 11, and 13, for purposes of clarity.

To convert all or a portion of freighter compartment back to a passenger mode, a quickly installable stowage bin 108 is lifted and presented to one or more support panels 110 until each latching assembly 146 on the stowage bin engages a mounting bolt 138. The stowage bin 108 is automatically locked due to the over-center action of the latching assembly 146. With the stowage bin hanging along its upper portion from one or more support panels 110, the bin 108 is rotated until a removal pin 160 can securely retain its lower portion on a pair of inboard mounting brackets 158. Completion of the conversion is effected by installing the interior trim and PSUs 62.

No readjustment nor realignment of any stowage bin 108 is required with the present invention. The conversion takes place rapidly, easily, and with no tools. No auxiliary lighting is necessary. The stowage bins 108 are securely in place and all loads experienced during flight are adequately accommodated. Finally, from a passenger stand-point, the installation looks like it was done in the factory and is of high quality.

Changes and modifications in the specifically described embodiments can be carried out without departing from the scope of the invention which is intended to be limited only by the scope of the appended claims.

What is claimed and desired to be secured by Letters Patent of the United States is:

1. An article of manufacture comprising:
   (a) a bin for stowing articles within an aircraft, said aircraft having a longitudinal axis, said bin comprising a back panel, at least two side panels, and a bottom face;
   (b) means forming a latch for releasably mounting the upper portion of said bin to a first stowage bin support member affixed in direct contact with the internal framework of said aircraft, said latch means having a translatable handle disposed on each of said side panels extending slightly below said bottom face, whereby in use, said handle may be translated to release said latch;
   (c) a bracket extending away from said back panel for limiting the motion of said bin along said longitudinal axis when said bin is mounted within said aircraft, and
   (d) an adjustable mounting bracket means attached to the lower portion of each of said side panels for releasably mounting said lower portion to a second stowage bin support member affixed in direct contact with the internal framework of said aircraft, each of said adjustable bracket means extending outwardly and rearwardly of said bin towards the outboard side of said aircraft when said bin is installed within said aircraft.

2. The article of claim 1, further comprising:
   (e) compressible means mounted on said back panel for dampening relative motion between said bin and said first and said second stowage bin support members when said bin is installed within said aircraft.

3. An apparatus for supporting and positioning a quickly removable stowage bin within an aircraft, comprising:
   (a) a stowage bin support panel having a lower, an intermediate, and an upper sector;
   (b) means for affixing said panel in direct contact with the internal framework of said aircraft, said panel affixing means comprising an upper support means for quickly attaching and releasing the upper portion of said bin using no tools;
   (c) first constraining means formed within the inboard facing side of said intermediate sector for mating with said bin and constraining the motion thereof along the thrust axis of said aircraft when said bin is supported and positioned by said panel;
   (d) second constraining means disposed on said panel and mountable to said internal framework for constraining the motion of said panel along the thrust axis of said aircraft, and
   (e) lower support means disposed on said lower sector for quickly attaching and releasing the lower portion of said bin using no tools.

4. The apparatus of claim 3, further comprising:
   means mounted on said upper sector for illuminating the interior of said aircraft, and
   means for mounting a ceiling panel on said upper sector.

5. The apparatus of claim 3, wherein said upper support means comprises a first and a second upper radial tie rod bracket, a slot formed in said upper sector, and a mounting bolt, said upper radial tie rod brackets being separated by said slot and connectable by said bolt, said bolt being attachable to radial tie rods comprising said internal framework, whereby in use radial loads experienced by said panel may be resisted.

6. The apparatus of claim 5, wherein said upper support means is disposed in the forward and aft portions of said upper sector.

7. The apparatus of claim 6, wherein said internal framework comprises at least one diagonal tie rod for resisting thrust loads experienced by said aircraft in use, said second constraining means comprising at least one diagonal tie rod bracket attached to a surface facing said diagonal tie rod, and means for affixing said diagonal tie rod bracket to said diagonal tie rod.

8. The apparatus of claim 7, wherein each of said diagonal tie rod brackets is disposed upon said upper sector.

9. The apparatus of claim 7, wherein each of said diagonal tie rod brackets is disposed upon said intermediate sector.

10. The apparatus of claim 7, wherein said first constraining means comprises at least one receptacle formed in said intermediate sector, said receptacle having a slot adapted to mate with a motion-limiting member mounted on and extending from said bin.

11. The apparatus of claim 10, wherein said lower support means comprises at least one mounting bracket disposed upon said lower sector and at least one quick removal pin attached in close proximity to said lower sector mounting bracket, whereby in use, said bin lower portion may be quickly attached and released.

12. The apparatus of claim 11, wherein said panel affixing means further comprises at least one bracket mounted to the outboard facing side of said lower sector, said outboard facing bracket being attachable directly to a radial tie rod comprising said internal framework.

13. The apparatus of claim 12, further comprising:
means mounted on said upper sector for illuminating the interior of said aircraft, and
means for mounting a ceiling panel on said upper sector.

14. The apparatus of claim 3, wherein said internal framework comprises a diagonal tie rod for resisting thrust loads experienced by said aircraft in use, said second constraining means comprising a diagonal tie rod bracket attached to a surface facing said diagonal tie rod, and means for affixing said diagonal tie rod bracket to said diagonal tie rod.

15. The apparatus of claim 14, wherein each of said diagonal tie rod brackets is disposed upon said intermediate sector.

16. The apparatus of claim 14, wherein each of said diagonal tie rod brackets is disposed upon said intermediate sector.

17. The apparatus of claim 14, wherein said first constraining means comprises at least one receptacle formed in said intermediate sector, said receptacle having a slot adapted to mate with a motion-limiting member mounted on and extending from said bin.

18. The apparatus of claim 17, wherein said lower support means comprises at least one mounting bracket disposed upon said lower sector and at least one quick removal pin attached in close proximity to said lower sector mounting bracket, whereby in use, said bin lower portion may be quickly attached and released.

19. The apparatus of claim 18, wherein said panel affixing means further comprises at least one bracket mounted to the outboard facing side of said lower sector, said outboard facing bracket being attachable directly to radial tie rods comprising said internal framework.

20. The apparatus of claim 19, further comprising:
means mounted on said upper sector for illuminating the interior of said aircraft, and
means for mounting a ceiling panel on said upper sector.

21. Apparatus comprising:
(a) at least one stowage bin;
(b) at least one support panel mounted directly to the internal framework of an aircraft;
(c) first quickly releasable means for mounting the upper portion of said bin to the upper portion of said support panel without the use of tools, and
(d) second quickly releasable means for mounting the lower portion of said bin to the lower portion of said support panel without the use of tools.

22. The apparatus of claim 21, further comprising:
first motion limiting means formed on an interior surface of said support panel facing said bin, and
second motion limiting means formed on the back panel of said bin cooperating with said first motion limiting means when said bin is mounted to said support panel.

23. The apparatus of claim 22, further comprising:
illumination means attached to the upper portion of said support panel.

24. The apparatus of claim 22, further comprising:
compressible means mounted on said back panel for contacting said interior surface and minimizing relative motion between said bin and said support panel when said bin is mounted to said support panel.

25. The apparatus of claim 24, further comprising:
illumination means attached to the upper portion of said support panel.

26. The apparatus of claim 21, further comprising:
compressible means mounted on said back panel for contacting an interior surface of said panel and for minimizing relative motion between said bin and said support panel when said bin is mounted to said support panel.

27. The apparatus of claim 26, further comprising:
illumination means attached to the upper portion of said support panel.

28. The apparatus of claim 21, further comprising:
illumination means attached to the upper portion of said support panel.

29. A system for converting all or part of an aircraft from a passenger mode to a freighter mode, said aircraft having an internal framework and a longitudinal axis, said system comprising:
(a) a stowage bin support panel having a lower, an intermediate, and an upper sector;
(b) upper panel mounting means for fastening said upper sector directly to upper radial tie rods comprising said framework;
(c) lower panel mounting means for attaching said lower sector directly to lower radial tie rods comprising said framework;
(d) thrust load bearing means for connecting said panel to at least one diagonal tie rod comprising said framework;
(e) a bin for stowing articles within said aircraft, said bin comprising a back panel, at least two side panels and a bottom face;
(f) means forming a latch for releasably securing said bin to said upper panel mounting means, said latch means being disposed upon said side panels;
(g) adjustable bracket means extending from said side panels;
(h) releasable means extending from said lower sector for supporting said adjustable bracket means, and
(i) means formed on said back panel and said intermediate sector for constraining motion along said longitudinal axis.

30. The system of claim 29, further comprising:
(j) compressible means formed upon said back panel and juxtaposed between said bin and a surface of said support panel facing said bin for dampening relative motion between said support panel and said bin;
(k) means mounted on said upper sector for illuminating the interior of said aircraft, and
(l) means for mounting a ceiling panel on said upper sector.

31. The system of claim 29, wherein said upper panel mounting means comprises a first and a second upper radial tie rod bracket, a slot formed in said upper sector, and a mounting bolt, said upper radial tie rod brackets being separated by said slot and connected by said bolt, said bolt being attached to said upper radial tie rods, whereby in use radial loads experienced by said support panel may be resisted.

32. The system of claim 31, wherein said lower panel mounting means comprises at least one bracket mounted to the outboard facing side of said lower sector, said outboard facing bracket being attachable directly to a radial tie rod comprising said framework.

33. The system of claim 32, wherein said releasable means comprises at least one mounting bracket disposed upon said lower sector and at least one quick removal pin attached in close proximity thereto engaging said adjustable bracket means and said lower mounting bracket, whereby in use said bin lower portion may be quickly attached and released.

34. The system of claim 33, wherein said constraining means comprises:
   at least one receptacle formed in said intermediate sector, said receptacle having a slot, and
   a motion-limiting member mounted on and extending from said back panel, said motion-limiting member engaging said slot.

35. The system of claim 34, further comprising:
   (j) compressible means formed upon said back panel and juxtaposed between said bin and a surface of said support panel facing said bin for dampening relative motion between said support panel and said bin;
   (k) means mounted on said upper sector for illuminating the interior of said aircraft, and
   (l) means for mounting a ceiling panel on said upper sector.

36. The system of claim 35, wherein said latch means comprises:
   (i) a housing having an outwardly facing first recess comprising a fixed upper lip and a fixed lower lip, said first recess being capable of receiving said mounting bolt;
   (ii) a cover attached to said housing, said cover having a fixed upper lip and a fixed lower lip coinciding with said housing upper lip and said housing lower lip, respectively;
   (iii) an elongated clamping jaw, disposed in a second recess formed between said housing and said cover, comprising a triggering arm and a latch member, said arm and said latch member defining a third recess capable of receiving said mounting bolt, said jaw being pivotably attached to said housing and said cover proximate said lower lips, whereby in use, said jaw is capable of pivoting from a receiving position, wherein said third recess faces outwardly from said housing and said arm is positioned between said upper and lower lips and capable of contacting said mounting bolt, and a latched position, wherein said latch member extends from said lower lips to said upper lips and said mounting bolt is constrained within said first recess;
   (iv) an intermediate link disposed on the lateral sides of said jaw and pivotably attached thereto away from said third recess at a first pivot point;
   (v) means attached to said intermediate link for biasing said jaw towards said receiving position and said latched position;
   (vi) a wedge-shaped handle link pivotably attached to said intermediate link at a second pivot point distal from said first pivot point, said handle link being pivotably supported by said housing and said cover at a third pivot point, said first, second, third pivot points lying substantially along the same axis when said jaw is in said latched position, and
   (vii) a translatable handle pivotably attached to an end of said handle link distal from said third pivot point, whereby in use, said latchable body contacts said arm and pivots said jaw away from said receiving position against the force of said biasing means into said latched position, and said handle pivots said handle link and said intermediate link against the force of said biasing means to pivot said jaw into said receiving position whereby the latching body is released from said first recess.

37. A method of mounting quickly releasable stowage bins within an aircraft relative to a reference axis using little or no tools, comprising:
   (a) securing a first support panel in direct contact with radial and diagonal tie rods comprising the interior framework of said aircraft;
   (b) releasably mounting the upper and lower portions of a first quickly releasable stowage bin on said first support panel using no tools;
   (c) installing a reference fixture within said aircraft and defining said reference axis, and
   (d) adjusting the position of said first support panel relative to said reference fixture to align said first support panel with said reference axis.

38. The method of claim 37, further comprising:
   (e) securing a second support panel in direct contact with radial and diagonal tie rods comprising the interior framework of said aircraft;
   (f) mounting the upper and lower portions of a second releasable stowage bin on said first support panel and said second support panel, and
   (g) adjusting the position of said second support panel relative to said reference fixture to ensure said first and said second stowage bins are in alignment.

* * * * *